(12) United States Patent
Doney et al.

(10) Patent No.: US 11,757,639 B2
(45) Date of Patent: Sep. 12, 2023

(54) METHOD, APPARATUS, AND COMPUTER-READABLE MEDIUM FOR SECURED DATA TRANSFER OVER A DECENTRLAIZED COMPUTER NETWORK

(71) Applicant: SECURRENCY, INC., Annapolis, MD (US)

(72) Inventors: George Daniel Doney, Annapolis, MD (US); Ihor Yermakov, Abu Dhabi (AE)

(73) Assignee: SECURRENCY, INC., Annapolis, MD (US)

( * ) Notice: Subject to any disclaimer, the term of this patent is extended or adjusted under 35 U.S.C. 154(b) by 299 days.

(21) Appl. No.: 17/313,105

(22) Filed: May 6, 2021

(65) Prior Publication Data
US 2021/0377028 A1    Dec. 2, 2021

Related U.S. Application Data

(60) Provisional application No. 63/030,387, filed on May 27, 2020.

(51) Int. Cl.
| | |
|---|---|
| *H04L 29/06* | (2006.01) |
| *H04L 9/32* | (2006.01) |
| *H04L 9/08* | (2006.01) |
| *G06Q 20/06* | (2012.01) |
| *G06Q 20/38* | (2012.01) |
| *H04L 9/00* | (2022.01) |

(52) U.S. Cl.
CPC ....... *H04L 9/3213* (2013.01); *G06Q 20/0658* (2013.01); *G06Q 20/3829* (2013.01); *H04L 9/0825* (2013.01); *H04L 9/0861* (2013.01); *H04L 9/50* (2022.05); *H04L 2209/56* (2013.01)

(58) Field of Classification Search
CPC ... H04L 9/3213; H04L 9/0825; H04L 9/0861; H04L 9/50; H04L 2209/56; H04L 9/3247; H04L 9/3239; G06Q 20/0658; G06Q 20/3829; G06Q 2220/00; G06Q 20/02; G06Q 20/223
See application file for complete search history.

(56) References Cited

U.S. PATENT DOCUMENTS

| | | |
|---|---|---|
| 10,193,696 B2 | 1/2019 | Struttmann et al. |
| 10,489,597 B2 | 11/2019 | Safford et al. |
| 10,540,654 B1 * | 1/2020 | James ................. G06Q 20/223 |
| 10,673,626 B2 | 6/2020 | Sandberg-Maitland et al. |
| 10,735,202 B2 | 8/2020 | Jayachandran et al. |

(Continued)

FOREIGN PATENT DOCUMENTS

WO    2020028197 A1    2/2020

OTHER PUBLICATIONS

International Searching Authority, International Search Report & Written Opinion for International Application No. PCT/US2021/033954 dated Aug. 24, 2021.

*Primary Examiner* — Mahfuzur Rahman
(74) *Attorney, Agent, or Firm* — NEO IP

(57) ABSTRACT

A method and apparatus for secured, peer-to-peer transfer of data rights over a computer network, the method being accomplished by a distributed computing system including a distributed ledger platform and an off-chain data host platform. On-chain authorization tokens are used to track data access rights, enforce access policies, and control distribution of encryption keys.

10 Claims, 9 Drawing Sheets

(56) References Cited

U.S. PATENT DOCUMENTS

| | | | |
|---|---|---|---|
| 11,159,307 B2 | 10/2021 | Bathen et al. | |
| 11,194,837 B2 | 12/2021 | Vo et al. | |
| 11,200,569 B1* | 12/2021 | James | G06Q 20/381 |
| 11,250,423 B2 | 2/2022 | Heyner | |
| 11,250,466 B2 | 2/2022 | Soundararajan et al. | |
| 11,301,460 B2 | 4/2022 | Rich et al. | |
| 11,308,487 B1* | 4/2022 | Foster | G06Q 20/3829 |
| 11,334,883 B1* | 5/2022 | Auerbach | G06Q 20/223 |
| 11,488,147 B2 | 11/2022 | Sheng et al. | |
| 11,488,161 B2 | 11/2022 | Soundararajan et al. | |
| 11,501,370 B1* | 11/2022 | Paya | G06Q 20/3676 |
| 11,551,191 B2 | 1/2023 | McNamara et al. | |
| 2019/0294822 A1 | 9/2019 | Hennebert | |
| 2020/0090143 A1 | 3/2020 | Lervolino | |
| 2021/0037060 A1* | 2/2021 | Robison | H04L 63/123 |
| 2021/0042735 A1 | 2/2021 | Majidi et al. | |
| 2021/0192501 A1 | 6/2021 | McNamara et al. | |
| 2021/0201328 A1* | 7/2021 | Gunther | G06Q 20/322 |
| 2021/0304200 A1* | 9/2021 | Doney | H04L 9/50 |
| 2021/0377028 A1* | 12/2021 | Doney | G06Q 20/223 |
| 2021/0377263 A1 | 12/2021 | Law | |
| 2022/0040557 A1* | 2/2022 | Tran | G06F 1/163 |
| 2022/0051261 A1 | 2/2022 | Vetas | |
| 2022/0200973 A1* | 6/2022 | Tola | H04L 63/0428 |
| 2022/0270080 A1 | 8/2022 | Yantis et al. | |

\* cited by examiner

METHOD, APPARATUS, AND COMPUTER-READABLE MEDIUM FOR SECURED DATA TRANSFER OVER A DECENTRLAIZED COMPUTER NETWORK

RELATED APPLICATION DATA

This application claims priority to U.S. Provisional Application No. 63/030,387 filed on May 27, 2020, the entire disclosure of which is incorporated herein by reference.

FIELD OF THE INVENTION

The invention relates to cryptographic methods to securely share data rights via decentralized networks.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional Self-Sovereign Data Storage (SSDS) includes techniques to ensure that the issuer maintains control over distribution of data and the DataHost never has access to the data in an unencrypted form. A variation on the implementation may include an administrator role with control over data distribution but no access to the underlying data. SSDS has been applied in personal identification applications, medical records applications and more general content distribution applications. However, conventional SSDS require centralized trusted parties and do not permit peer to peer distribution, transfer, and delegation of rights. As a result, data owners have no mechanism for controlling and managing data dissemination without relying on centralized systems for permission management.

Recently, the concept of "Self-Sovereign Identity' (SSI), a user-centric identity has become known. 551 is intended to enable a person to be in full control of the their own identity and related data in a decentralized identity ecosystem. Identity-related data can be stored in a digital wallet. Participant nodes of the decentralized network can issue, receive, and validate credentials that contain individual claims. This is accomplished by Distributed Ledger Technology (DLT), utilizing strong cryptography for building a global blockchain-like consensus network that provides trust for all participants. However, such systems and methods do not: support generalized forms of data; provide a flexible model for the transfer, distribution control, and revocation of data rights; or include policy enforcement for access rules that may be dependent on time or other environmental factors.

SUMMARY

The disclosed implementations provide a technical mechanism for secure, trustless data transfer and data rights exchange through the minting and use of a data authorization tokens in a decentralized framework that ensures authorized participating parties can access sensitive data when necessary, and only when necessary. The disclosed implementations are designed such that data owners can disseminate data to counterparties, that might not have a relationship with, and might not trust, each other, such that counterparties can only access data when authorized and with full accountability. The disclosed implementations can include an "on-chain" token registry and an "off-chain" data host, as well as other distributed components, as described in detail below.

One aspect of the disclosed implementations is a method for secured, multi-lateral, assured data transfer over a computer network for the exchange of data $D_1$ related to qualifying transactions, the method being accomplished by a distributed computing system including a distributed ledger platform and a data host platform, the method comprising: transferring, from a sending party to a receiving party, access rights to $D_1$, the transferring including: the sending party generating an encryption key, $K_1$, encrypting $D_1$ with $K_1$ using a symmetric encryption algorithm to create encrypted data $D_1^*$; the sending party transmitting $D_1^*$ to the data host platform, wherein the data host platform cannot access $D_1$; the sending party receiving a pointer to $D_1^*$, an uniform resource identifier $D_1^*ID$ that corresponds to $D_1^*$; the sending party encrypting $K_1$ with a public key of the receiving party using an asymmetric encryption algorithm to create an encrypted key $K_1^*$; the sending party signing an Issue transaction via a WalletRegistry smart contract on a distributed ledger platform to create an AuthToken, that is a transferrable non-fungible token on a distributed ledger that expresses a data structure containing $D_1^*ID$, $K_1^*$, and other data such as access policy; and transferring the AuthToken to a cryptographic wallet associated with the receiving party; and accessing $D_1$ by the receiving party, the accessing including: the receiving party signing an access transaction via the WalletRegistry smart contract on the distributed ledger platform resulting in the creation of a session ID, $S_1$; the receiving party sending an access request for $D_1^*$ to the data host platform including $S_1$ and $D_1^*ID$; the data host platform validating the request platform by calling the WalletRegistry smart contract on the distributed ledger platform which consults data authorization policy for validation; in response to the validating, the data host, encrypting $D_1^*$ with the public key of the recipient using asymmetric encryption, resulting in $D_1^{}$, and sending $D_1^{}$ to the receiving party; and the receiving party decrypting $D_1^{**}$ using the receiving party's private key using asymmetric encryption resulting in $D_1^*$, decrypting the encryption key $K_1^*$ with the receiving party's private key using asymmetric encryption resulting in $K_1$, and decrypting the escrowed data $D_1^*$ with the encryption key $K_1$ using symmetric encryption resulting in $D_1$ to thereby gain access to the data $D_1$.

Another aspect is the process for generating or validating a session ID $S_1$ in the Wallet Registry smart contract that includes retrieving, interpreting, and enforcing an access policy, if assigned the to AuthToken, to determine whether to initiate the access session, where the policy may include rules regarding the qualifying attributes of a transaction, sending party, receiving party, or other context. Policy access, interpretation, and enforcement can be an implementation of the policy engine described in U.S. patent application Ser. No. 16/143,058, the disclosure of which is incorporated herein by reference.

DETAILED DESCRIPTION

By developing a secure, decentralized method to transfer data access rights via decentralized systems, such as blockchain based systems, the disclosed implementations implement Decentralized Data Rights Management (DDRM) which extends SSDS to enable peer to peer distribution, transfer, and delegation of rights. As a result, the disclosed implementations provide data owners with a mechanism to control and manage data dissemination without a dependency on centralized systems for permission management.

Disclosed implementations of DDRM can employ digital tokens, such as blockchain based ERC-721 compliant tokens, as AuthTokens to enable authorization transfer via standardized cryptographic wallets which represent addresses on a decentralized computing network. IN addition to access rights, AuthTokens may represent a broader range of data rights (e.g., update and/or delete rights). AuthToken actions and transfers may be governed by Decentralized Policy Enforcement techniques such as those described in U.S. patent application Ser. No. 16/143,058.

Convenient and Practical use of decentralized Self-Sovereign data management systems requires an innovative architecture to solve 3 technical problems:
  Self-sovereignty: A practical model for the Issuer (data owner) to manage, set policy, and audit data rights. [Technical challenge: Secure key transfer]
  Policy based peer to peer sharing: A secure, intuitive model for peer to peer sharing of rights [Technical challenge: Leverage blockchain for decentralization without key storage on chain]
  Scalable, secure hosting: Scalable hosting of data without providing the Data Host access to the underlying data [Technical challenge: Leverage established cloud hosting patterns without providing the host access to data]

The technical solution to these problems includes: a) an implementation with at least two layers of encryption designed to ensure that only authorized recipients may access the data in an unencrypted form; b) the use of tokens (e.g., ERC-721 tokens) for rights transfer and audit; and c) a novel hybrid blockchain/cloud storage architecture. By developing a secure, decentralized method to transfer access rights and other rights via blockchain based systems, the disclosed implementations extend traditional Data Rights Management models and conventional self-sovereign data models to enable peer to peer distribution, transfer, and delegation of rights. As a result, the disclosed implementations provide data owners a mechanism for controlling and managing data dissemination without a dependency on centralized systems for permission management.

The disclosed implementations use multiple layers of encryption to protect data from unauthorized access. The first layer protects the document from access from the DataHost (self sovereign) or any other unauthorized party. The second layer enables access transfer to authorized Recipients within a Session established on the decentralized network, i.e., "onchain".

Figure 1:
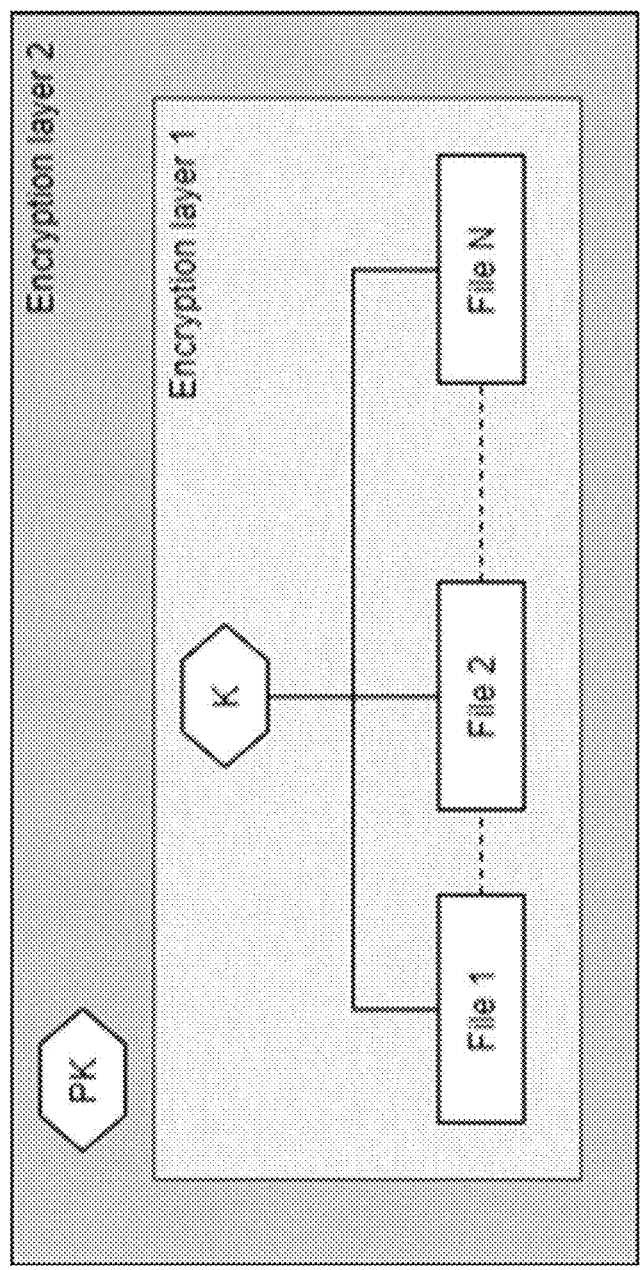
FIG. 1 is a block diagram of an encryption architecture in accordance with disclosed implementations.

As illustrated in FIG. 1, Encryption layer 1, which can be based on a known symmetric encryption algorithm on the client side, enables scalable remote storage and access to data while ensuring the DataHost never has access to the data in unencrypted form. Secure decentralized transfer of key "K" to a designated Recipient over the decentralized network is achieved through a novel combination of components and a novel data model of the system. The technique uses an AccessToken containing an AccessKey to facilitate rights transfer on, for example, public blockchains without compromising the decryption key. Encryption layer 2 is used by the DataHost for, in response to a valid access request, encrypting the inner envelope using a public key of the requesting wallet using asymmetric encryption techniques. This prevents a "man in the middle" attack by ensuring only the designated wallet can decrypt the key "K".

Figure 2:
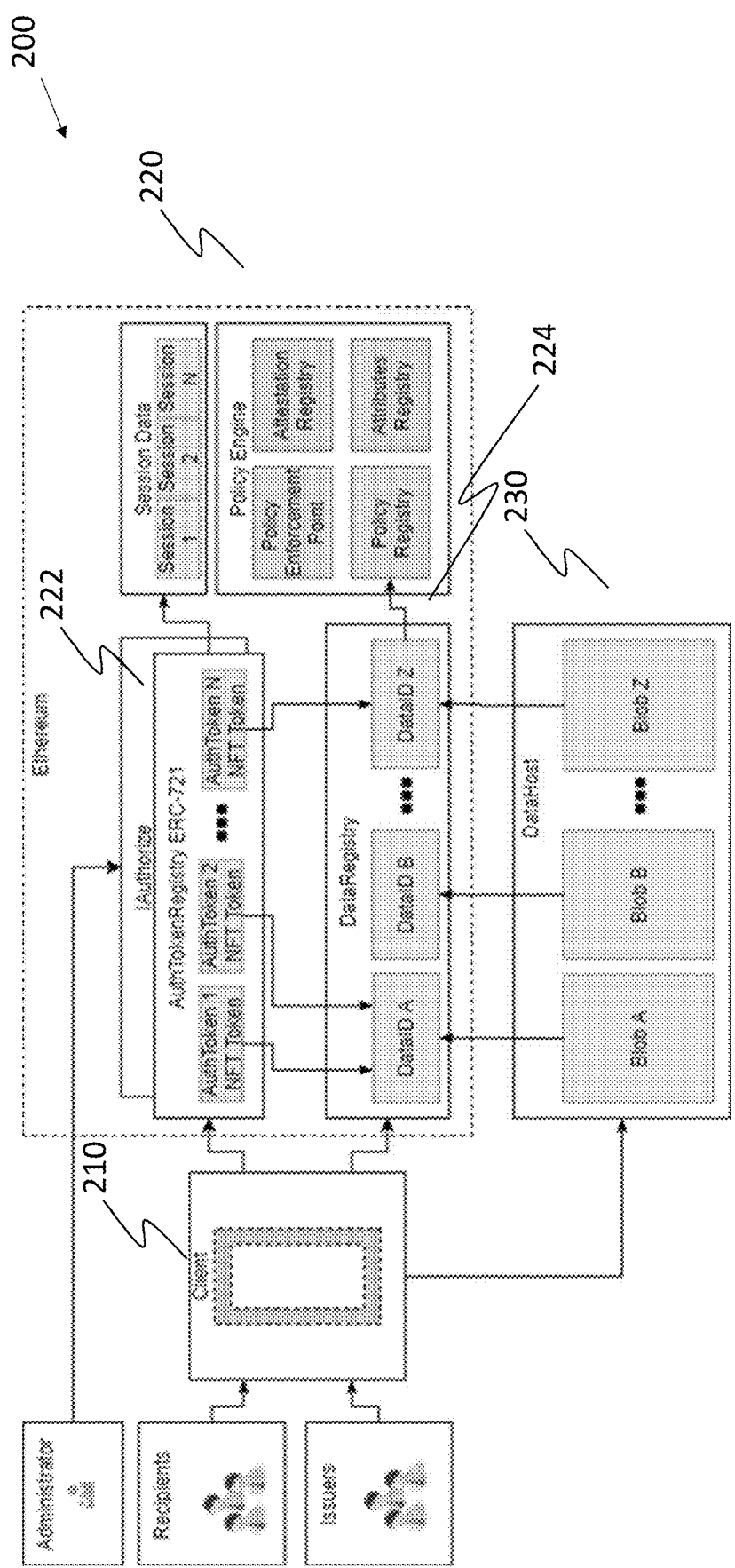
FIG. 2 is a schematic diagram of a DDRM architecture in accordance with disclosed implementations.

FIG. 2 illustrates a hybrid distributed networked computing system 200 in accordance with a disclosed implementation. System 200 addresses the above-noted technical issues through a distributed computing system including client interface computing platform 210 (also referred to herein as "client 210"), off-chain data host 230, and on-chain distributed ledger platform 220 for registration of wallets and secure, assured transfer of rights to client data when a qualifying transaction occurs. Distributed ledger platform 220 is a decentralized infrastructure such as an Ethereum blockchain or other distributed ledger technology. Data host 230 can be implemented as off-chain data storage for storing encrypted PII data or other sensitive data which cannot be decrypted by the data host 230. The encrypted data may be hosted using on-premises storage, cloud storage, decentralized storage systems such as IPFS (IPFS decentralized data storage), or other storage techniques.

Distributed ledger platform 220 includes authorization token registry 222 ("AuthTokenRegistry") and Data Registration Smart Contract(s) 224 ("DataRegistry"). Disclosed implementations can use an extended ERC-721 token for the on-chain representation of the authorization tokens ("AuthToken"). As noted above, data host 230 can be used for storage of encrypted data. For example, IPFS can be used for cloud storage of encrypted documents. IPFS (InterPlanetary File System) is a decentralized storage solution for blockchain-based content. When using IPFS, files are divided into parts and stored across a network of nodes, that track the file by hashes. The parts can be assembled together, based on their hash value, to recreate the original file. In the examples herein, clusters of data are referred to as "files". However, the "files" can be one or more packets or clusters and need not be stored as a single file in the conventional sense of the word.

The data host has no access to the unencrypted data. Policy engine 226 of distributed ledger platform 220 ensures regulatory compliance for any transactions and includes a policy enforcement point (PEP), a policy registry, and attestation registry and an attributes registry. As noted above, policy engine 226 can be an implementation of the policy engine described in U.S. patent application Ser. No. 16/143,058.

Client 210 and data host 230 can be implemented using a range of hardware, software programming and architecture techniques. Disclosed implementations can use C++, Java, node.js, Flutter, React, or any other modern programming language for the client interface and data host. The Client interface can use symmetric and asymmetric encryption, while the data host can use asymmetric encryption, as described in greater detail below.

Decentralized Digital Rights Management can be thought of in terms of 7 main processes:

Data Registration: Owner creates and delivers an ERC-721 token providing access to protected content Data Access: Authorized Recipient accesses protected content Additional Authorization: Owner provides additional access to protected content Rights Delegation: Recipient delegates rights (with ability to revoke) to another user while retaining rights Rights Revocation: Owner or Administrator (if implemented) removes rights from a Recipient Rights Monitoring: Owner or Administrator (if implemented) reviews all rights, transfers, and authorizations Policy Enforcement: Use of a policy engine to enforce complex authorization or transfer policy The AuthToken Interface Specification can be implemented as code stored on the distributed ledger. An example of such code, in the Solidity smart contract language, is set forth below.

```
pragma solidity >=0.5.0 <0.6.0;
pragma experimental ABIEncoderV2;
/**
@title Interface of the Authorization Token
*/
interface IAuthToken {
/**
@dev Creates access token
@param dataId Data or document identifier
@param accessKey Encrypted key
@param to A token recipient
*/
function createAuthToken(uint dataId, string calldata accessKey, address to) external;
/**
@dev Prepares information about account
@param account Account address
*/
function getFilesForAccount(address account)
external
view
returns (
uint[50] memory accessTokensIds,
uint[50] memory dataIds,
bool[50] memory isOwner
);
/**
@dev Creates auth session, returns accessKey and sessionId
@param authTokenId Access token identifier
*/
function createSession(uint authTokenId) external returns (string memory);
/**
@dev Returns list of the users that have access to the data
@param authTokenId Auth token identifier
*/
function getPermissionsById(uint authTokenId) external view returns (address[ ] memory);
/**
@dev Save permissions for the data specified in the token
@param authTokenId AuthToken identifier
@param accessKeys List of the access keys for the data
@param recipients List of the recipients of the permissions
*/
function savePermissions(uint authTokenId, string[ ] calldata accessKeys, address[ ] calldata recipients) external;
/**
```

-continued

```
@dev Get access key by auth token id
@param authTokenId Access token identifier
*/
function getAccessKeyById(uint authTokenId) external view returns (string memory);
/**
@dev Reads session details
@param sessionId Session identifier
*/
function getSessionDetails(uint sessionId) external view returns (address recipient uint dataId, uint ttl);
}
```

Figure 3:
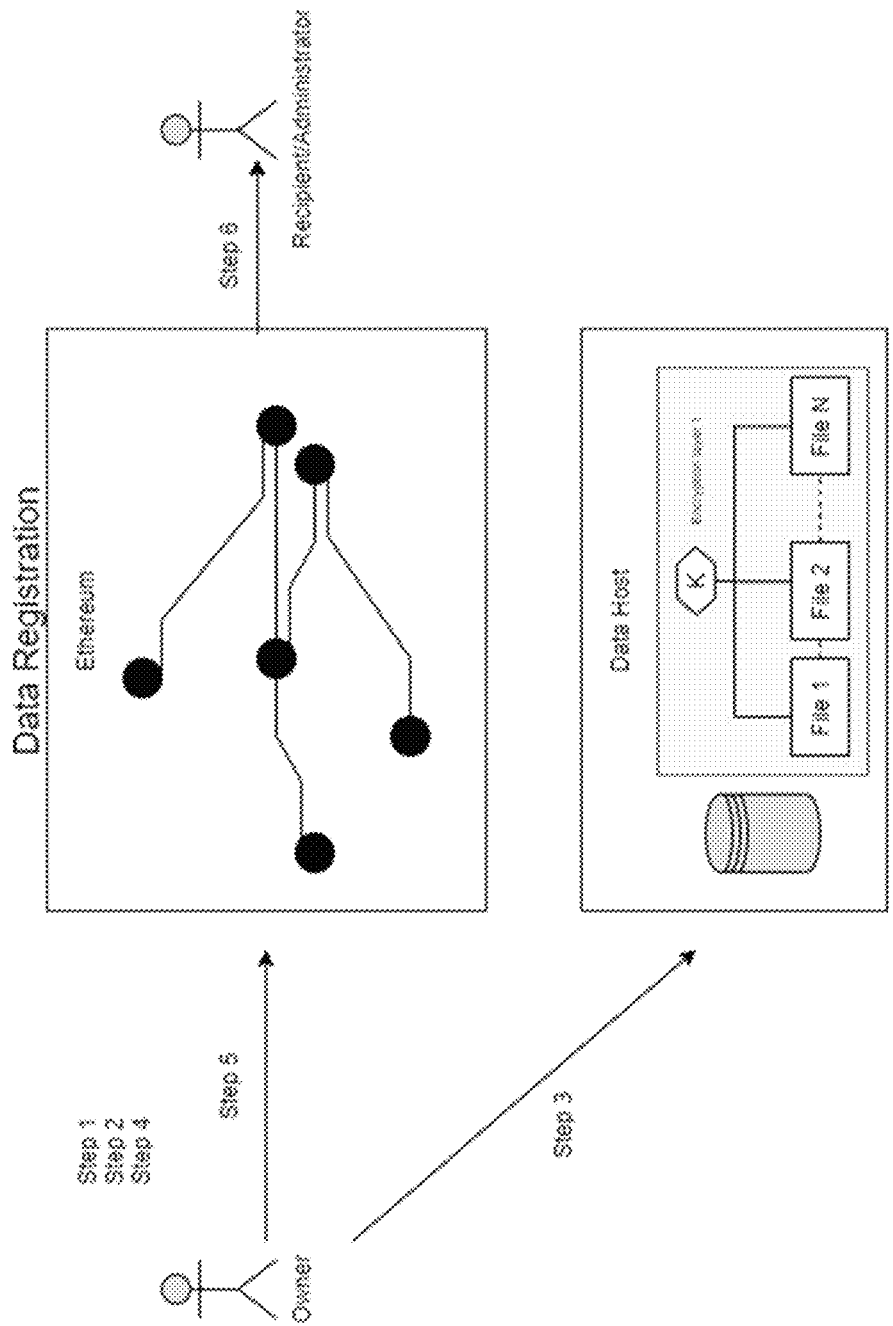
FIG. 3 is a schematic illustration of a data registration workflow in accordance with disclosed implementations.

FIG. 3 illustrates a Data Registration process that can be accomplished by the computing system shown in FIG. 2. As shown in FIG. 3, A data Owner can register post data for distribution. To share data, the owner creates an access key, K, for encryption using known key generation techniques, at step 1. The Owner retains K. At step 2, the Owner then encrypts, using a symmetric encryption algorithm, the PII data using key K. At step 3, the Owner then sends the encrypted data, using client 210, to data host 230 and data host 230 generates an internal ID "DataID" that can be used to identify and retrieve the encrypted data in the system.

At step 4, the Owner encrypts key K, using an asymmetric encryption algorithm, with the public key of the Recipient's wallet resulting in an access key "AccessKey" for the Recipient. As a result, only the desired Recipient holds the private key for the public address, the means to decrypt the contents, a required step to access the underlying shared data. Note, the sender is not required to have the Recipient's private key in order to encrypt the contents. At step 5, the Owner signs a register request, createAuthToken, to the blockchain authorization token registry 222 to issue one or more AuthToken(s) for each desired Recipient, by means of a smart contract of the distributed ledger platform 220. At step 6, the issued AuthToken is sent to a wallet corresponding to the Recipient(s) using ERC-721 (or equivalent) transfer functions. The AuthToken can be a non-fungible token (NFT) expressed as a data structure that contains (at least):

AuthTokenID (a unique token identifier)
AccessKey (generated in step 4 above)
DataID (generated in step 3 above)
PolicyID (optional—for identifying a policy to be applied/enforced by policy engine 226)
Source (Owner of data)
Data Verification Entity (Optional)

Figure 4:
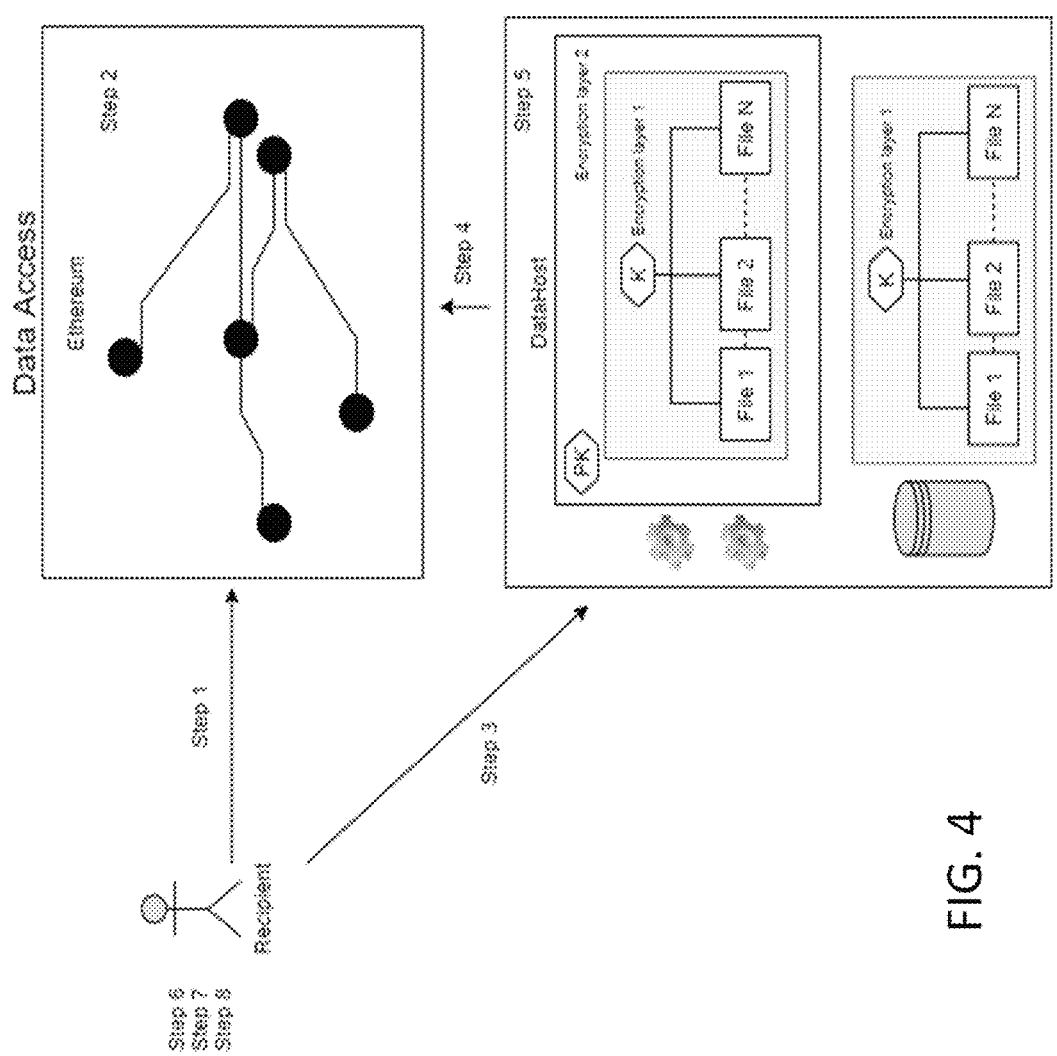
FIG. 4 is a schematic illustration of a data access workflow in accordance with disclosed implementations.

FIG. 4 illustrates a Data Access process by which the Recipient gains access to encrypted data based on the rights granted above. Of course, in a multilateral exchange of data each party may implement the process of FIG. 5 (below) to provide data access to the other party or multiple parties. At step 1, the Recipient signs an access request message, createSession, including AuthTokenID to distributed ledger platform 220 to open an authorization session for the requested data. At step 2, a smart contract on distributed ledger platform 220 checks whether the Recipient is an AuthToken holder for the requested data, i.e. has been granted access rights consistent with the authorization request, consulting with the policy engine, which can be an implementation of the policy engine described in U.S. patent application Ser. No. 16/143,058, and has supported a qualifying transaction for the client wallet. If yes, a SessionID is generated. The SessionID is stored on-chain in session registry 228 (see FIG. 2). The SessionID can contain AuthTokenID for the corresponding AuthToken, time to live (TTL) or other expiration data, and data rights (access, update, delete, etc). At step 3, the Recipient sends a request message containing the SessionID to data Host 230.

At step 4, data Host 230 sends a request message, getSessionDetails, containing the SessionID to on-chain platform 220 to obtain DataID and TTL data and the public key PK of an account associated with the authorization request. During this step, the Wallet Registry smart contract may consult the policy engine to determine if a qualifying event has occurred or other conditions have been met prior to sending a response containing the encrypted data. At step 5, data Host 230 retrieves the corresponding encrypted files using the DataID and encrypts the files again using asymmetric encryption and the public key PK of the wallet requesting access (this effects encryption layer 2 noted above). Subsequently, the Recipient decrypts the data using its wallet's private key resulting in data packet with encryption layer 1 noted above (i.e., data encrypted with key K). Then, the Recipient decrypts AuthTokenID using its private key yielding encryption key K and, the Recipient decrypts data using key K to thereby gain access to the data.

Figure 5:
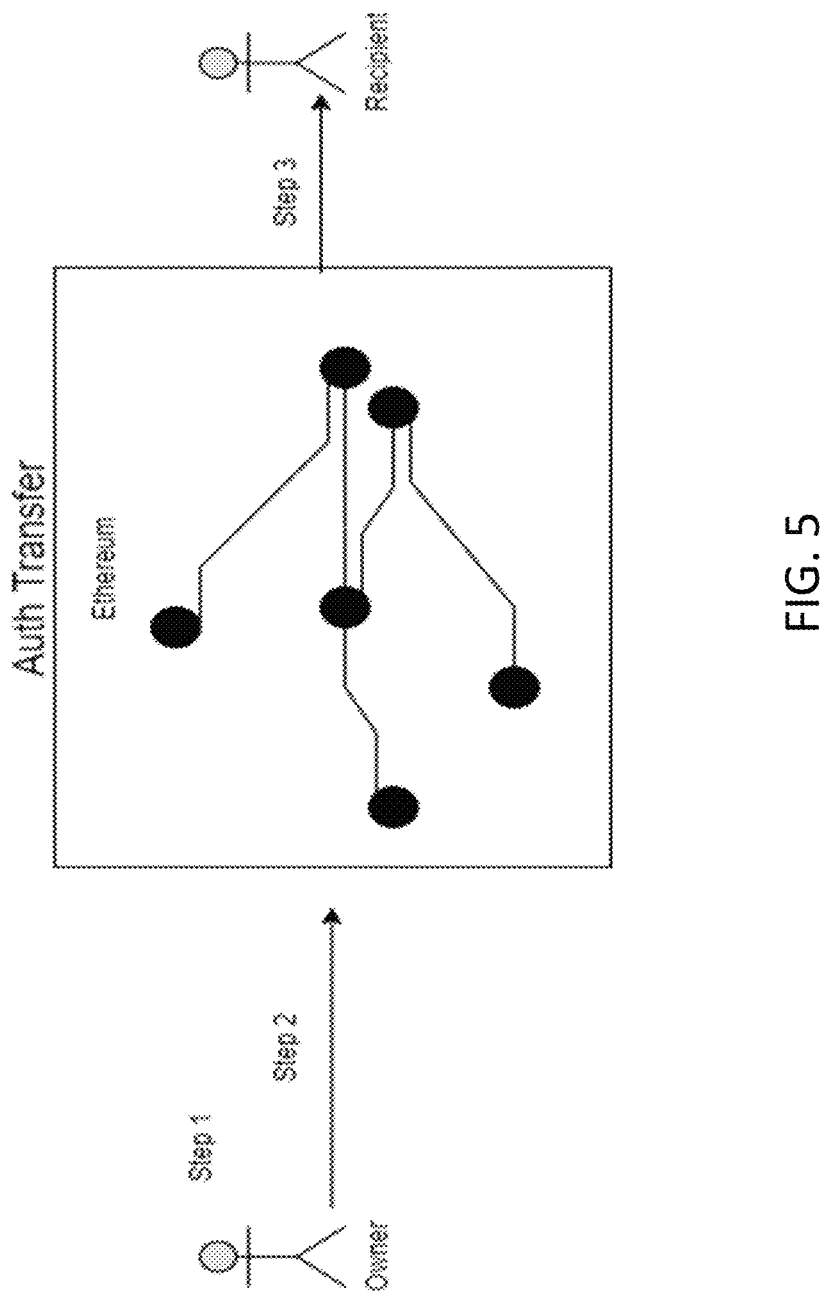
FIG. 5 is a schematic illustration of an additional authorization workflow in accordance with disclosed implementations.

FIG. 5 illustrates the steps for an Owner, as an originating party to provide data access rights to a Recipient, in accordance with a disclosed implementation. Of course, in a multilateral exchange of data each party may implement the process of FIG. 4 to provide data access to the other party or multiple parties. At step 1, an owner, asymmetrically encrypts key K using the public key of one or more wallets of a Recipient to thereby create an AccessKey for each wallet that will receive authorization. At step 2, the Owner signs an authorize request, createAuthToken, to distributed ledger platform 220 resulting in the smart contract issuing one or more AuthToken(s) for the Recipient(s) who will have access to the data when a qualifying transaction occurs. The AuthToken data structure is described above. Note that the Source of the AuthToken data structure indicates the wallet of the original owner (issuer). At step 3, AuthTokens are sent to wallets of Recipient(s), using an ERC-721 (or equivalent) transfer function.

Figure 6:
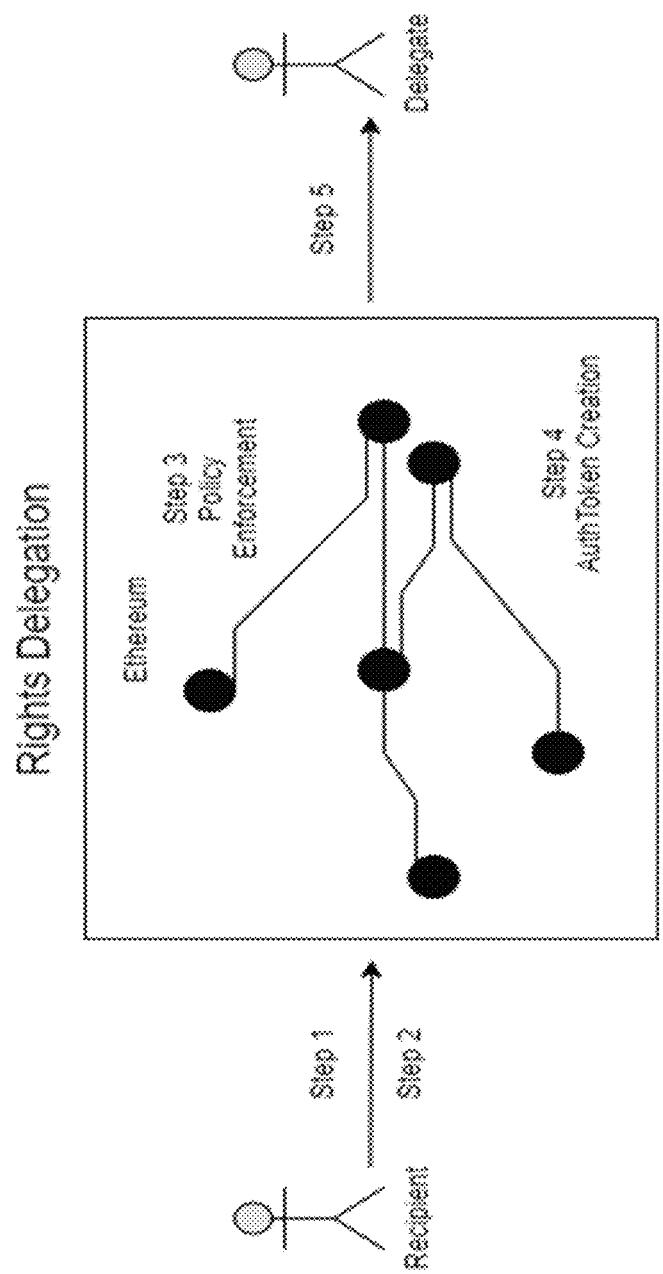
FIG. 6 is a schematic illustration of a rights delegation workflow in accordance with disclosed implementations.

FIG. 6 illustrates a Rights Delegation process. At Step 1, the Recipient decrypts AccessKey, as described above in the Data Access flow, to obtain "K" which was used for data encryption. At Step 2, the Recipient uses public key ("PK") of the Delegate to encrypt key "K" to obtain a new AccessKey. At Step 3, the Recipient signs an authorize request, createAuthToken, to the distributed ledger platform 220 AuthDataRegistry SmartContract. The SmartContract determines if Transfer is eligible based on Policy, and if authorized conducts Step 4 in which a new AuthToken is created with the Recipient as Source. At Step 5, the Recipient transfers the new AuthToken to the Delegate using an ERC-721 (or equivalent) transfer function. Note that the Issuer and the Sender may revoke Delegate's Authorization.

Figure 7:
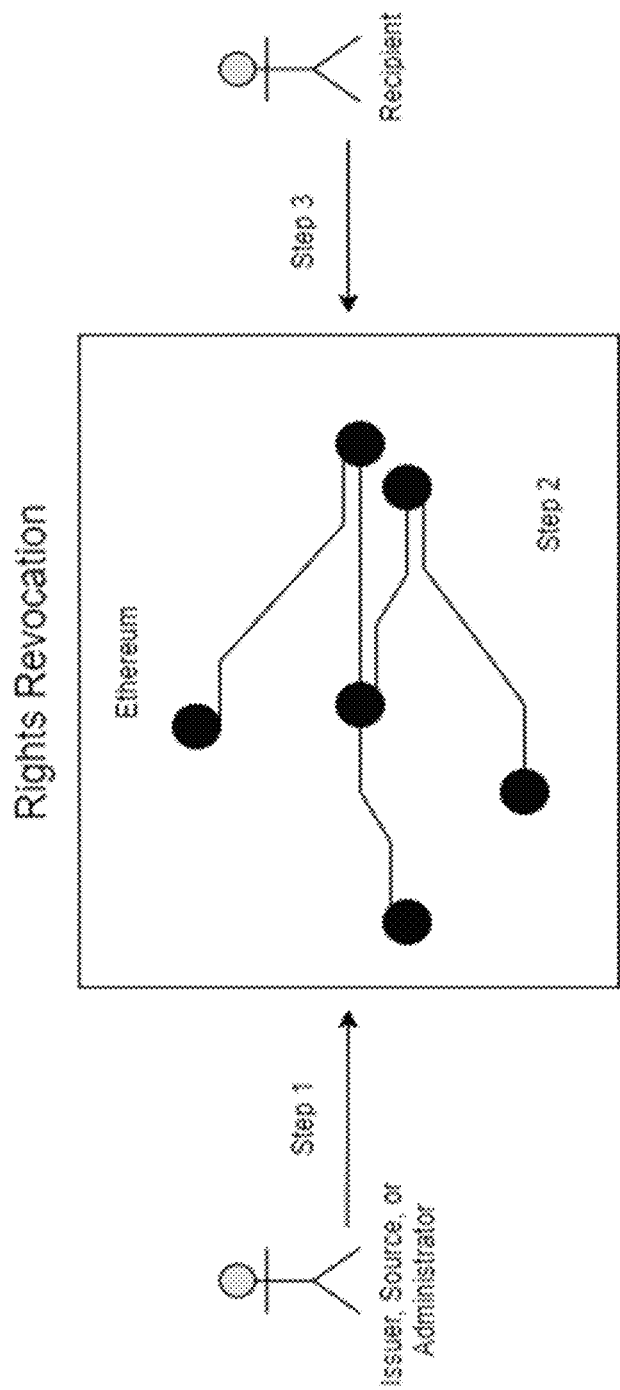
FIG. 7 is a schematic illustration of a rights revocation workflow in accordance with disclosed implementations.

FIG. 7 illustrates a Rights Revocation process. At Step 1, the data Owner (or Source, or Administrator) signs a Revoke transaction to the AuthDataRegistry SmartContract. At step 2, the SmartContract determines eligibility of the initiator of the transaction. If eligible, the AuthToken and any active Sessions are removed. At step 3, The AuthToken is no longer accessible via the Recipient's wallet. Note that the presence of an Administrator clawback is a preference that can be enabled/disabled at the SmartContract scope (e.g., for all tokens) or a per token scope by the Owner. AuthTokens may be set to expire at a certain time by the Owner. The AuthToken is not removed from the Recipient, but will no longer enable access. The Recipient can submit a Reauthorize request. If approved, Recipient's authorization will be restored.

Figure 8:
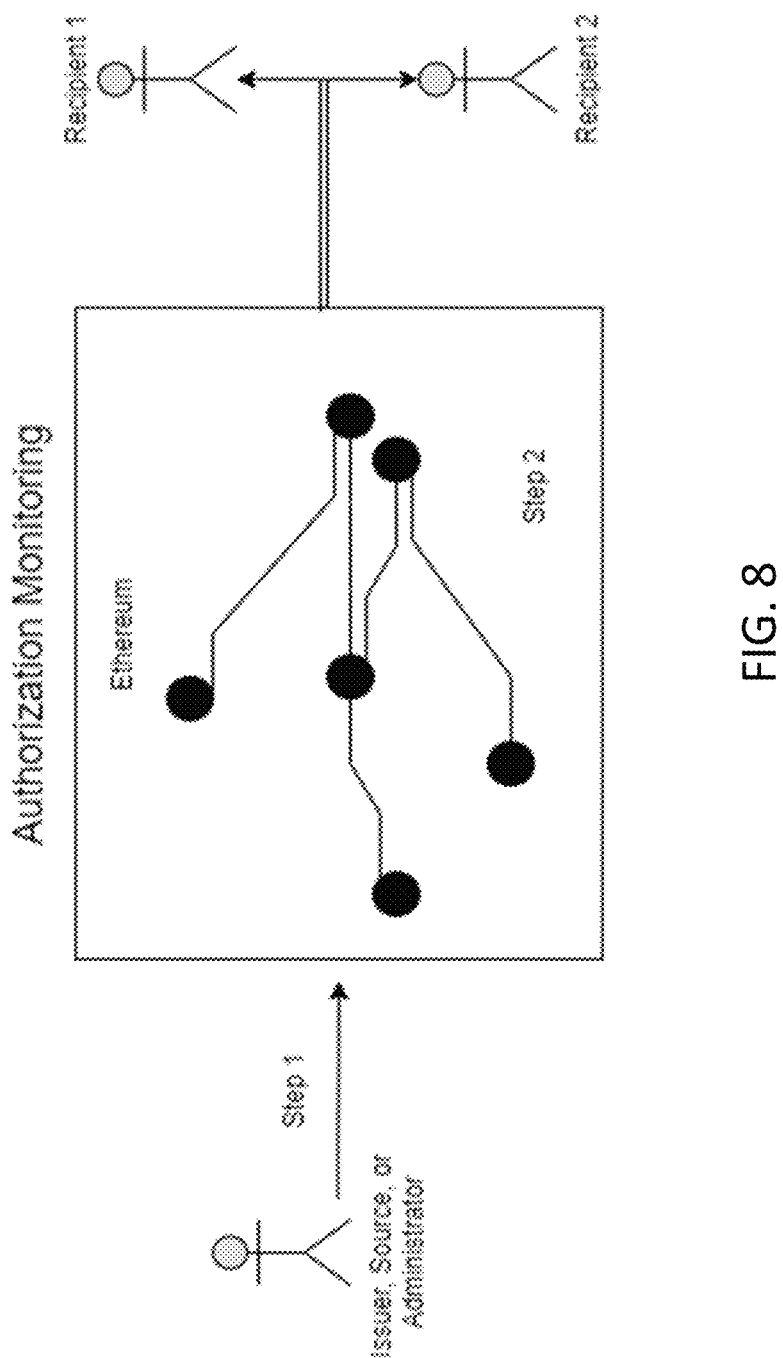
FIG. 8 is a schematic illustration of a rights monitoring workflow in accordance with disclosed implementations.

FIG. 8 illustrates a Rights Monitoring process. At Step 1, Owner (or Source, or Administrator) requests all granted authorizations from AuthTokenRegistry smart contract, getPermissionsById. At step 2, the smart contract returns results.

Figure 9:
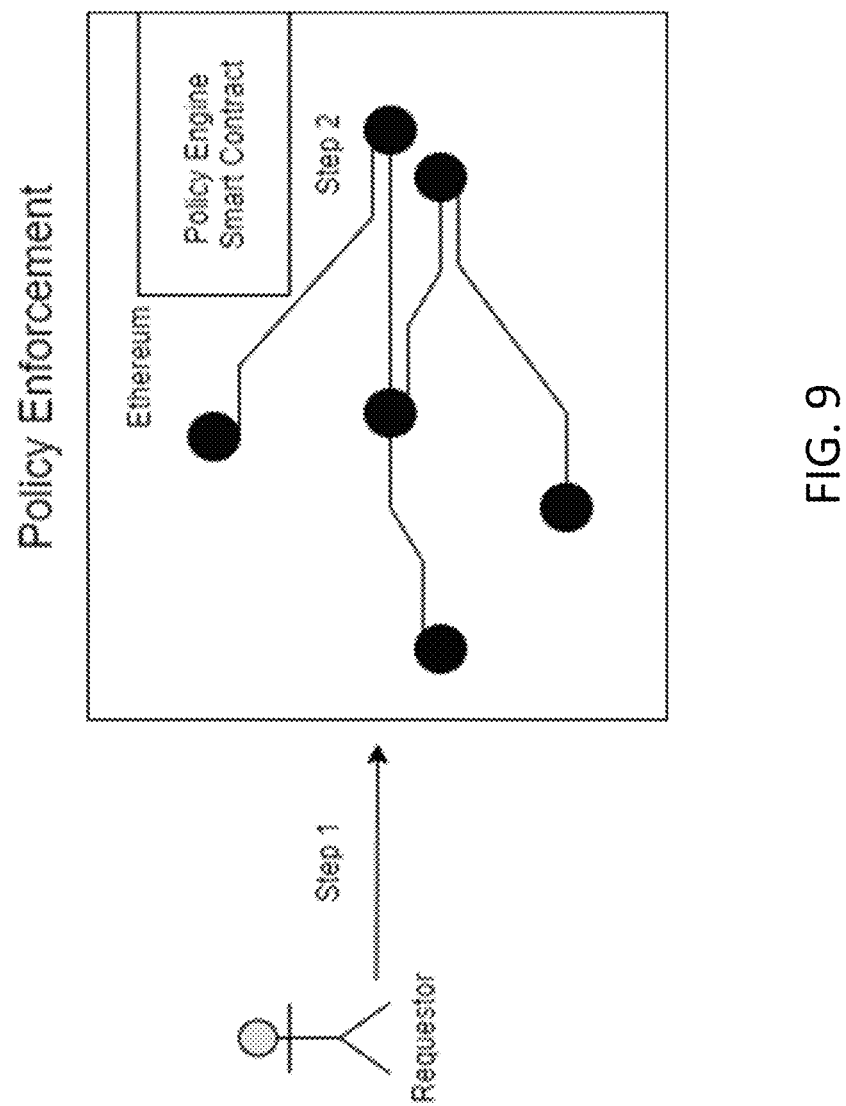
FIG. 9 is a schematic illustration of a policy enforcement workflow in accordance with disclosed implementations.

FIG. 9 illustrates a Policy Enforcement process. At Step 1, the Requestor signs atransaction (such as an Authorize, Access, Delegate, Revoke, or Transfer transaction) to AuthDataRegistry Smart Contract. At step 2, AuthDataRegistry Smart Contract consults the Policy Engine (described above with reference to U.S. patent application Ser. No. 16/143, 058) to verify the legitimacy of the request and responds with an error code & message if denied.

The workflows described above leverage the use of a data access token in the process of a secure, conditional exchange of information where multiple parties can be assured that the data is both properly used and is available on meeting the conditions. The Owner can have certainty in advance that access conditions must be met according to configured policies for the Recipient to gain access. The novel combination of data structures, on-chain and off-chain registries, key management and secure message flows allow the parties to be assured of secure data exchange. The disclosed implementations include one or more of the rights transfer and data access processes described above.

The disclosed implementations can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

While implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A method for secured, data transfer over a distributed computer system, the distributed computing system including a distributed ledger platform and a data host platform, the method comprising:

transferring, from a sending party to a receiving party, access rights to data $D_1$, the transferring including:

(b) the sending party generating an encryption key, $K_1$, and encrypting $D_1$ with $K_1$ using a symmetric encryption algorithm to create encrypted data $D_1^*$;

(c) the sending party transmitting $D_1^*$ to the data host platform, wherein the data host platform cannot access $D_1$;

(d) the sending party receiving a pointer to $D_1^*$, the pointer including an $D_1^*ID$ that corresponds to $D_1^*$;

(e) the sending party encrypting $K_1$ with a public key of the receiving party using an asymmetric encryption algorithm to create an encrypted key $K_1^*$;

(f) the sending party signing an Issue transaction via a WalletRegistry smart contract on a distributed ledger platform to thereby cause the WalletRegistry smart contract to create an AuthToken, the AuthToken being a transferrable non-fungible token on a distributed ledger that includes a data structure containing $D_1^*ID$, and $K_1^*$; and (g) transferring the AuthToken to a cryptographic wallet associated with the receiving party; and accessing $D_1$ by the receiving party, the accessing including:

(h) the receiving party signing an Access transaction via the WalletRegistry smart contract on the distributed ledger platform resulting in the creation of a session ID, $S_1$;

(i) the receiving party sending an access request for $D_1^*$ to the data host platform including $S_1$ and $D_1^*ID$;

(j) the data host platform validating the request platform by calling the WalletRegistry smart contract on the distributed ledger platform to thereby cause the WalletRegistray smart contract to consult at least one data authorization policy for validation of a qualifying transaction;

(k) in response to the validation, the data host, encrypting $D_1^*$ with the public key of the recipient using asymmetric encryption, resulting in $D_1^{}$, and sending $D_1^{}$ to the receiving party; and (l) the receiving party decrypting $D_1^{**}$ using the receiving party's private key using asymmetric encryption resulting in $D_1^*$, decrypting the encryption key $K_1^*$ with the receiving party's private key using asymmetric encryption resulting in $K_1$, and decrypting the escrowed data $D_1^*$ with the encryption key $K_1$ using symmetric encryption resulting in $D_1$ to thereby gain access to the data $D_1$.

2. The method of claim 1, wherein the data structure of the AuthToken specifies the at least one access policy.

3. The method of claim 2, wherein consulting with policy and validation of a qualifying transaction is accomplished during the creation of a session corresponding to the session ID.

4. The method of claim 1, wherein steps (a) and (b) are conducted multiple times to provide rights to respective additional recipients.

5. The method of claim 1, wherein steps (a) and (b) are conducted at least once by a Recipient in order to delegate respective rights to at least one other party as at lease one additional recipient.

6. The method of claim 1, wherein the process for generating or validating a session ID $S_1$ in the Data Registry smart contract includes:

retrieving, interpreting, and enforcing an access policy associated with the AuthToken to determine whether to initiate the access session, wherein the policy includes rules specifying the qualifying attributes of a transaction, sending party, and receiving party.

7. The method of claim 5, wherein the rules also specify transaction context data.

8. The method of claim 1, wherein the data Owner, Source, or Administrator can revoke access by recalling the AuthToken from the Recipient's wallet.

9. The method of claim 1, wherein the data Owner, Source, or Administrator can revoke review access records by calling the AuthToken smart contract to review activated sessions.

10. The method of claim 1, wherein the data structure the AuthToken also specifies:

AuthTokenID as a unique token identifier;

PolicyID as an identifier of a policy to be applied to transactions on the AuthToken;

SourceID indicating the owner of $D_1$; and

DataVerificationEntity ID indicating the entity for verification of data.

* * * * *